(12) United States Patent
Pietrzak et al.

(10) Patent No.: US 10,675,995 B2
(45) Date of Patent: Jun. 9, 2020

(54) VEHICLE SEAT COMPRISING A LATCHING DEVICE AND AN ADDITIONAL CONTROL DEVICE

(71) Applicant: Brose Fahrzeugteile GmbH & Co. KG, Coburg, Coburg (DE)

(72) Inventors: Grzegorz Pietrzak, Coburg (DE); Sebastian Meyer, Coburg (DE)

(73) Assignee: BROSE FAHRZEUGTEILE GMBH & CO. KG, COBURG, Coburg (DE)

( * ) Notice: Subject to any disclaimer, the term of this patent is extended or adjusted under 35 U.S.C. 154(b) by 298 days.

(21) Appl. No.: 15/323,954

(22) PCT Filed: Jun. 24, 2015

(86) PCT No.: PCT/EP2015/064235
§ 371 (c)(1),
(2) Date: Jan. 4, 2017

(87) PCT Pub. No.: WO2016/005189
PCT Pub. Date: Jan. 14, 2016

(65) Prior Publication Data
US 2018/0178679 A1    Jun. 28, 2018

(30) Foreign Application Priority Data

Jul. 7, 2014    (DE) .................. 10 2014 213 166

(51) Int. Cl.
*B60N 2/20* (2006.01)
*B60N 2/235* (2006.01)
(Continued)

(52) U.S. Cl.
CPC ............. *B60N 2/20* (2013.01); *B60N 2/12* (2013.01); *B60N 2/123* (2013.01); *B60N 2/2356* (2013.01); *B60N 2/36* (2013.01); *B60N 2205/50* (2013.01)

(58) Field of Classification Search
CPC ........ B60N 2/20; B60N 2/206; B60N 2/2354; B60N 2/2356; B60N 2/2358
See application file for complete search history.

(56) References Cited

U.S. PATENT DOCUMENTS 3,953,069 A * 4/1976 Tamura .................... B60N 2/20
                                                                        297/367 R
5,390,981 A * 2/1995 Griswold ............... B60N 2/232
                                                                        297/362.14
(Continued)

FOREIGN PATENT DOCUMENTS

CN    1765263 A    5/2006
CN    103079881 A    5/2013
(Continued)

OTHER PUBLICATIONS

KR Office action dated Mar. 30, 2018 cited in corresponding KR Application No. 10-2017-7001388, 7 pages, English translation, 5 pages.
(Continued)

*Primary Examiner* — David R Dunn
*Assistant Examiner* — Christopher E Veraa
(74) *Attorney, Agent, or Firm* — Lewis Roca Rothgerber Christie LLP

(57) ABSTRACT

A vehicle seat comprising at least one first and one second adjustment part and a latching device is provided. The first adjustment part is formed by a backrest of the vehicle seat and the second adjustment part is formed by a seat part of the vehicle seat. The first adjustment part is lockable in a first adjustment region in a plurality of adjustment positions relative to the second adjustment part by means of the latching device, and is adjustable relative to the second adjustment part when the latching device is in a release position, for setting the backrest in its inclination with respect to the seat part. The first adjustment part is adjustable
(Continued)

from the first adjustment region into a second adjustment region in which the backrest is folded forward in the direction of the seat part or even onto the seat part.

11 Claims, 7 Drawing Sheets

(51) Int. Cl.
  *B60N 2/12* (2006.01)
  *B60N 2/36* (2006.01)

(56) References Cited

U.S. PATENT DOCUMENTS

| | | | |
|---|---|---|---|
| 5,718,481 A * | 2/1998 | Robinson | B60N 2/2354 |
| | | | 297/367 R |
| 5,788,330 A * | 8/1998 | Ryan | B60N 2/2354 |
| | | | 297/367 R |
| 5,899,532 A | 5/1999 | Paisley et al. | |
| 6,619,741 B1 | 9/2003 | Tame | |
| 7,380,885 B2 * | 6/2008 | Fischer | B60N 2/20 |
| | | | 297/362 |
| 8,491,054 B2 * | 7/2013 | Myers | B60N 2/20 |
| | | | 297/378.1 |
| 2007/0102981 A1 * | 5/2007 | Pejathaya | B60N 2/20 |
| | | | 297/367 R |
| 2010/0123343 A1 * | 5/2010 | Bonk | B60N 2/2358 |
| | | | 297/378.12 |
| 2010/0133886 A1 | 6/2010 | Gi et al. | |
| 2010/0141007 A1 * | 6/2010 | Kienke | B60N 2/206 |
| | | | 297/367 R |
| 2014/0138998 A1 * | 5/2014 | Christoffel | B60N 2/2354 |
| | | | 297/367 R |
| 2014/0145484 A1 * | 5/2014 | Kirubaharan | B60N 2/2358 |
| | | | 297/378.1 |
| 2015/0202996 A1 * | 7/2015 | Kajale | B60N 2/206 |
| | | | 297/363 |
| 2016/0297328 A1 * | 10/2016 | Pluta | B60N 2/12 |
| 2017/0158091 A1 * | 6/2017 | Kojima | B60N 2/20 |
| 2017/0355289 A1 * | 12/2017 | Spangler | B60N 2/933 |

FOREIGN PATENT DOCUMENTS

| | | |
|---|---|---|
| DE | 699 08 633 T2 | 4/2004 |
| DE | 10 2005 052 201 A1 | 5/2007 |
| DE | 10 2010 045 738 A1 | 3/2012 |
| EP | 1 652 721 A2 | 5/2006 |
| JP | 5282011 | 5/2013 |
| KR | 10-2010-0062228 | 6/2010 |

OTHER PUBLICATIONS

CN Office action dated Jun. 5, 2018 cited in corresponding CN Application No. 201580037519.X, 7 pages.
English translation of CN Office action dated Jun. 5, 2018 cited in corresponding CN Application No. 201580037519, submitted in an IDS on Jul. 16, 2018, 5 pages.

* cited by examiner

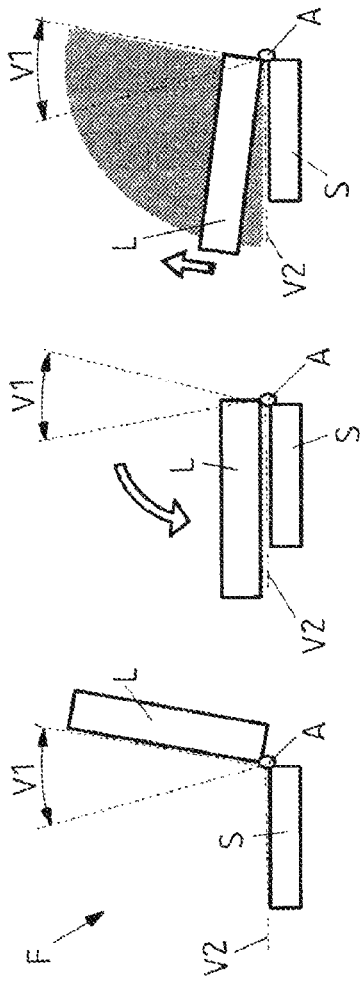

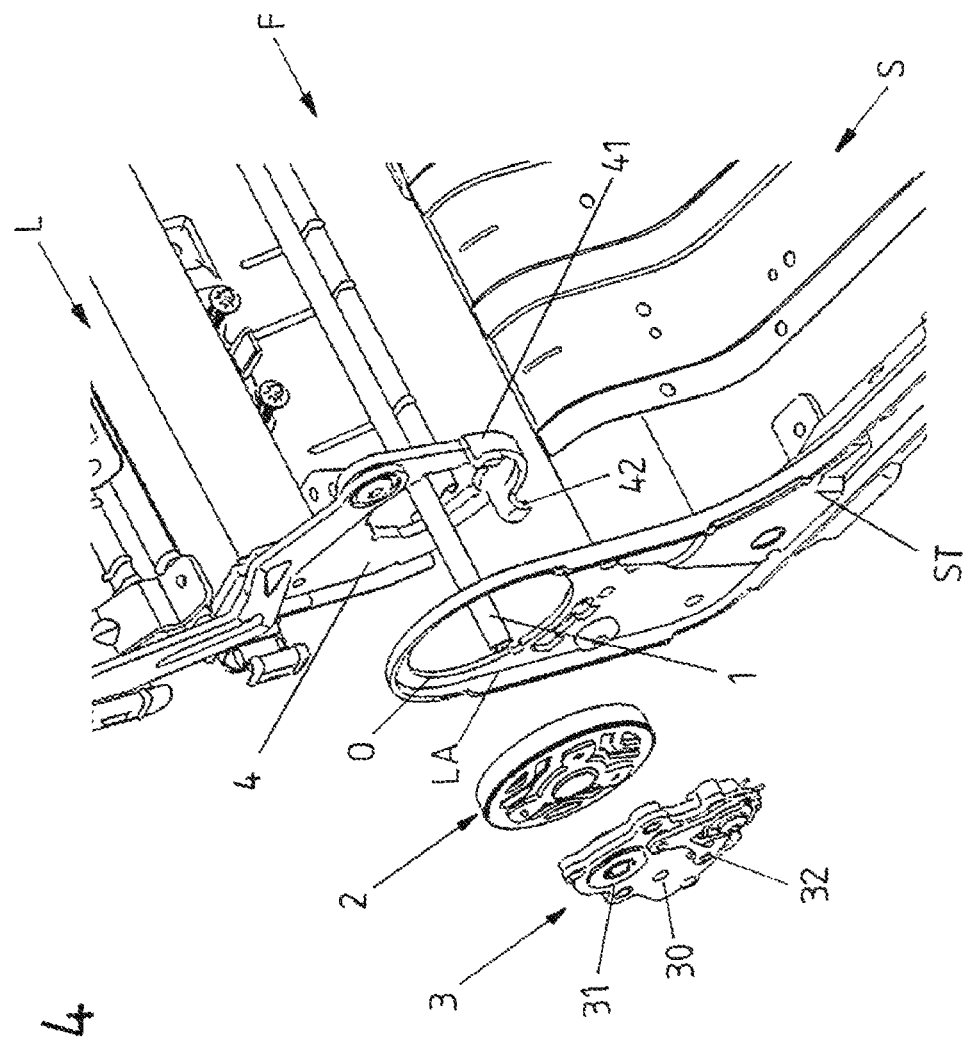

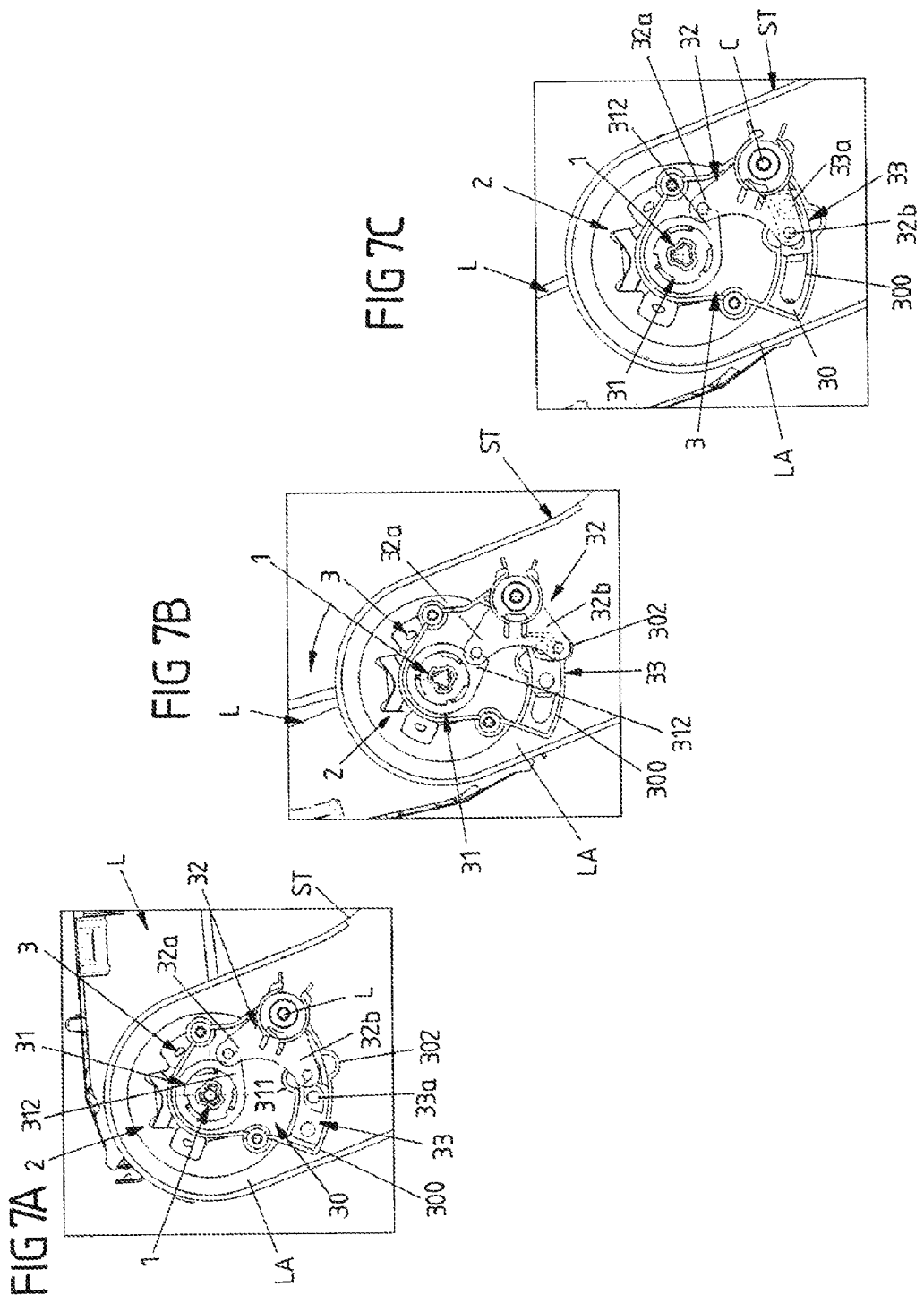

VEHICLE SEAT COMPRISING A LATCHING DEVICE AND AN ADDITIONAL CONTROL DEVICE

CROSS-REFERENCE TO A RELATED APPLICATION

This application is a National Phase Patent Application of International Patent Application Number PCT/EP2015/064235, filed on Jun. 24, 2015, which claims priority of German Patent Application Number 10 2014 213 166.9, filed on Jul. 7, 2014.

BACKGROUND

The invention relates to a vehicle seat.

A vehicle seat of this type has at least one first and one second adjustment part and also a latching device via which the first adjustment part is lockable in a first adjustment region in different adjustment positions relative to the second adjustment part. The first adjustment part can be, for example, a backrest of the vehicle seat that is mounted pivotably relative to a seat part of the vehicle seat, as the second adjustment part. However, the first adjustment part may also be a foldable and/or extendable head rest of the vehicle seat, an adjustable center armrest, a seat surface or seat pan of the vehicle seat that is adjustable in its inclination and/or height and/or longitudinal position (for setting the seat depth), or a seat under frame of the vehicle seat that is adjustable in the longitudinal direction of the seat.

In particular in the case of such adjustment parts of a vehicle seat, it is known to be able to set and lock said adjustment parts in their position or location in a first adjustment region, for example according to user requirements. Furthermore, it is known to be able furthermore to adjust, in particular fold or move, such adjustment parts into a second adjustment region which lies outside the first adjustment region and, for example, defines a non-use position of the respective adjustment part.

Also in such a second adjustment region, the adjustment part is then lockable in at least one adjustment position customarily via the same latching device via which locking takes place in the first adjustment region. For example, a headrest can be settable in its height and/or inclination in a first adjustment region. By folding over the headrest, the latter is transferred into a second adjustment region by the headrest being accommodated merely in a space-saving manner on a backrest of the vehicle seat, but not being able to serve to support a head of a seat user in the event of a crash. On the contrary, by means of a folded-over headrest, the associated backrest can generally be arranged more compactly in a loading compartment position.

In the case of a first adjustment part which is defined by a backrest, the backrest is, for example, settable in its inclination relative to the seat part of the vehicle seat in various use positions in a first adjustment region. Furthermore, the backrest can be folded into a second adjustment region toward the seat part in order to transfer the back rest into a loading compartment position. The backrest is then likewise lockable in said loading compartment position.

What are referred to as passive latching devices which are frequently used in this connection automatically lock the first adjustable adjustment part in an adjustment position reached in the first adjustment region and permit an adjustment only after the latching device which is prestressed into a latching position is unlocked. In the case of a backrest which is settable and lockable in its inclination via a latching device having at least one latching fitting, the latching device locks automatically when the backrest is folded back from a loading compartment position folded forward onto the seat part. The latching device automatically changes here from a release position into a latching position in order to lock the backrest in an adjustment position in the first adjustment region when the backrest is adjusted back from a loading compartment position of the second adjustment region into a use position of the first adjustment region.

Up to now, the folded-back backrest is locked in the first possible use position. In this first use position, the backrest customarily still has a pronounced inclination forward with respect to the seat part, and a seat user generally has to actuate and unlock the latching device once again in order to be able to set an advantageous adjustment position of the backrest. This reduces the operating convenience.

DE 10 2010 045 738 A1 furthermore discloses a vehicle seat in which a first adjustment part in the form of a backrest is mounted pivotably with respect to a seat part of the vehicle seat, as the second adjustment part. The vehicle seat here has a memory device in order, when the backrest is folded back from a second adjustment region defining an easy-entry position into a use position of a first adjustment region, to ensure that the backrest is automatically locked again in an adjustment position which the backrest has taken up before being folded forward into the easy-entry position. However, the adjustment position taken up upon the folding-back action therefore depends on the seat position of a previous seat user and therefore has to be regularly changed before another seat user can sit comfortably and securely supported again on the vehicle seat.

SUMMARY

It is therefore an object of the present invention to provide a vehicle seat which is improved in this respect and in which, in particular in the event of a change of a first adjustment part between different adjustment regions relative to a second adjustment part on the vehicle seat, it is more easily possible to predetermine a certain reference or comfort position of the first adjustment part in which the first adjustment part is automatically locked relative to the second adjustment part via the latching device.

This object is achieved with the vehicle seat as described herein.

A vehicle seat according to the invention here has at least one first and one second adjustment part and also a latching device, wherein the first adjustment part is lockable in a first adjustment region in a plurality of adjustment positions relative to the second adjustment part by means of the latching device, and is adjustable relative to the second adjustment part when the latching device is in a release position, the first adjustment part is adjustable from the first adjustment region into a second adjustment region and, in the second adjustment region, is likewise lockable relative to the second adjustment part in at least one adjustment position—and optionally likewise by means of the latching device, the latching device automatically changes from a release position into a latching position in order to lock the first adjustment part in an adjustment position in the first adjustment region when the first adjustment part is adjusted from the second adjustment region into the first adjustment region, and a preferably mechanical control device which interacts with the latching device and which keeps the latching device in a release position when the first adjustment part is adjusted from the second adjustment region into the first adjustment region and until the first adjustment part has been adjusted beyond at least a first of the possible adjustment positions of the first adjustment region, and permits a change into a latching position only when the first adjustment part reaches a certain subsequent adjustment position in the first adjustment region that is preset as a reference position (P), for a typical seat user, within the first adjustment region (V1) is provided.

The present invention is therefore based on the basic concept that a first adjustment part has two adjustment regions which differ from each other and in which said adjustment part is adjustable and lockable relative to a second adjustment part of the vehicle seat and in which it can be controlled via an additional control device interacting with the latching device during an adjustment from the one into the other adjustment region in which of the possible adjustment positions of the first adjustment region automatic locking of the first adjustment part takes place.

For example, a first adjustment part is formed by a backrest of the vehicle seat. The first adjustment part defines the possible use positions of the backrest here relative to a second adjustment part in the form of a seat part, in which an inclination of the backrest is settable and lockable via the latching device. The second adjustment region defines a loading compartment position of the backrest, in which said backrest is folded forward in the direction of the seat part or even onto the seat part. The effect now achieved by the control device provided according to the invention is that the backrest, when folded back out of the loading compartment position, is not automatically locked again in the first use position—with respect to the pivoting direction of the backrest. On the contrary, the latching device is initially still kept in a specific manner in a release position via the control device until one or more of the possible use positions, which are settable again subsequently, have been passed through and the backrest reaches a certain use position preset as the reference position.

In a variant embodiment, the solution according to the invention therefore specifically makes provision for the control device to permit latching in a reference position which is independent of the seat user and is also independent of and optionally different from a position of the first adjustment part that the latter had taken up before the adjustment into the second adjustment region. For example, a first adjustment part in the form of a backrest when folded back out of a cargo or easy-entry position of a second adjustment region is latched in a reference position of a first adjustment region and therefore in a possible comfort position which is different from a comfort position which the backrest had taken up before being folded forward into the cargo or easy-entry position. A variant of the solution according to the invention therefore differs in particular from known memory devices in vehicle seats with an easy-entry function, which memory devices are intended to ensure, when a backrest is folded back, that the backrest is locked in a previous comfort position set individually by a seat user.

With a solution according to the invention, it is therefore achieved in a simple and preferably purely mechanical manner that a first adjustment part is adjustable and lockable between two possible end positions in a first adjustment region, but, upon adjustment from a second adjustment region into the first adjustment region, is not locked at the first end position reached in the first adjustment region. On the contrary, the latching device is acted upon via the control device in such a manner that, during an adjustment from the second adjustment region into the first adjustment region, the (first) end position can be passed through without automatic locking of the first adjustment part taking place. However, after the first adjustment part has reached a predetermined adjustment position in the first adjustment region and has been locked here, locking of the first adjustment part over the entire first adjustment region between the two end positions and in particular in the initially passed-over first end position is again possible via the latching device without the control device acting here on the latching device. Therefore, when a first adjustment part is adjusted from a second into a first adjustment region, at least one of the otherwise possible adjustment positions of the first adjustment region is blocked via the control device, and therefore the first adjustment part is locked in a certain reference position within the adjustment region.

It is preferably provided in this connection that, when the first adjustment part is adjusted from the second adjustment region into the first adjustment region, the control device is activated, for example even during an adjustment in the second adjustment region, and is (automatically) deactivated again before the predetermined reference position is reached and the first adjustment part is locked in this reference position, and therefore locking of the first adjustment part over the entire first adjustment region is subsequently made possible via the latching device. The control device is therefore designed here in such a manner that, during an adjustment of the first adjustment part within the first adjustment region, the control device does not act on the latching device in order to keep the latter in a release or latching position, but rather preferably acts on said latching device only during an adjustment from the second adjustment region into the first adjustment region, in order to keep the latching device in a release position only temporarily and depending on the angular position of the first adjustment part.

In principle, the adjustment position, which is predetermined by the control device and is referred to as the reference position, within the first adjustment region can be selected in such a manner that, in said reference position, the first adjustment part takes up a position on the vehicle seat that minimizes a risk of injury for a seat user in the event of a crash. The reference position which is taken up is selected here, for example, in such a manner that a minimum level of safety is ensured for a seat user who is typical in respect of height and/or weight, and does not involve any increase in the risk of injury for the seat user. In the reference position, the respective first adjustment part can on the contrary be present in a position on the vehicle seat that ensures the best possible occupant protection for a typical seat user.

Alternatively or additionally, the reference position can also predetermine a position of the respective first adjustment part in which comfortable sitting for the seat user on the vehicle seat is assisted by the first adjustment part.

In an exemplary embodiment, the control device has at least one control member which can be used to act upon an actuator element of the latching device in order to keep the latching device in the release position when the first adjustment part has been adjusted from the second adjustment region into the first adjustment region. The control member preferably acts here on an actuator element which has to be adjusted even during normal adjustment of the first adjustment part in order to release the first adjustment part. For example, this involves an actuator shaft which couples two latching fittings on the left and right side of the backrest to each other and which has to be rotated in order to release locking via the latching fittings and consequently to be able to pivot the backrest relative to the seat part. A control device additionally provided according to the invention can therefore exert here via its control member a holding force on said actuator shaft in order to keep the latching device in a release position and accordingly to keep an associated latching fitting in an unlocked state.

The control member of the control device can be adjustable here between an active position and an inactive position, wherein, in the active position, a holding force is exerted on the actuator element of the latching device by means of the control member, and, in the inactive position, no force is transmitted to the actuator element by means of the control member. In this manner, the control device, via its control member, does not impair the operation of the latching device if the control member is in an inactive position. The control member is preset here in the direction of the inactive position as the zero position and is adjusted into the active position only by the first adjustment part being adjusted from its second adjustment region into the first adjustment region.

In order to couple the control member to the actuator element, the control device can have a driver element which is connected to the actuator element—preferably for rotation therewith. The control member is then designed and provided here in order to exert a force on the driver element and by this means on the actuator element during an adjustment of the first adjustment part from the second adjustment region into the first adjustment region, and therefore the latching device changes into a release position and/or is kept in said release position. For example, the actuator element can comprise an actuator shaft which is mounted rotatably on the vehicle seat and, for the release/opening of the latching device, has to be rotated by a predetermined actuating angle such that the first adjustment part is adjustable in its first adjustment region relative to the second adjustment part. The driver element of the control device is then connected here to the actuator shaft for rotation therewith and interacts with the control member of the control device in such a manner that, by means of the control member, a rotation of the actuator shaft by the actuation angle is likewise achieved and/or the rotated actuator shaft is kept in a position in which the latching device is released/opened when the first adjustment part is adjusted from its second adjustment region into the first adjustment region. Consequently, an actuator element is not only actuable—preferably manually—here by a user in order to transfer the latching device into a release position and in order to be able to adjust the first adjustment part in a specific manner in the first adjustment region. What is more, the control device also always acts on the actuator element without action of the user in order to keep the latching device in a release position when the first adjustment part is adjusted from the second adjustment region into the first adjustment region.

In an exemplary embodiment, the control member of the control device is adjustable for this purpose by means of the first adjustment part itself. In other words, during the adjustment of the adjustment part from the second into the first adjustment region, an adjustment force applied for this purpose to the first adjustment part is therefore at least partially also used to adjust the control member of the control device and, for example, to transfer same from an inactive position into an active position in order to block at least one or more adjustment positions of the first adjustment region and only to permit the locking of the first adjustment part in a certain adjustment position predetermined as the reference position.

In an exemplary embodiment, the control member of the control device is mounted rotatably. In this case, the control member can be mounted on the second adjustment part or on a bearing component of the control device arranged on the second adjustment part.

In a variant embodiment, the control device furthermore has an adjustable transmission element with a control contour via which the transmission element forces a certain adjustment movement on the control member, for example in order to change from an inactive position into an active position in which a (retaining) force is exerted by means of the control member on the actuator element for keeping the latching device in its release position.

In a development, it can furthermore be provided that at least two different positions are predetermined for the control member via the control contour of the transmission element depending on whether the first adjustment part is adjusted from the first adjustment region into the second adjustment region or conversely from the second adjustment region into the first adjustment region. Depending on the adjustment direction of the first adjustment part with respect to the second adjustment part, the control member is therefore adjusted here via the transmission element in the one or the other manner. By this means, it can also be achieved, for example, that, during an adjustment from the first adjustment region into the second adjustment region, the control member is displaced into a (safety) position in which an action of the control member in order to release the latching device is reliably prevented. In such a safety position, the control member is blocked against an action—possibly exerted via a driver element of the control device—on the latching device. The latching device is therefore not prevented from automatically locking the first adjustment part via the control device. In the case of an opposite adjustment of the first adjustment part from the second adjustment region to the first adjustment region, the control member is by contrast adjusted via the control contour of the transmission element into an alternative (active) position in which the control member brings about keeping of the latching device in the release position until the desired reference position in the first adjustment region is reached.

In an exemplary embodiment, the transmission element interacts via its control contour with the control member in such a manner that the control member is adjusted in a first adjustment direction when the first adjustment part is adjusted from the first adjustment region into the second adjustment region, and the control member is adjusted in a second adjustment direction—preferably opposed to the first adjustment direction—when the first adjustment part is adjusted from the second adjustment region into the first adjustment region. Depending on the adjustment direction of the first adjustment part relative to the second adjustment part, it is therefore achieved here via the control contour of the transmission element that the control member is also adjusted into one of two different adjustment directions in order first not to impair a locking of the latching device and secondly to ensure the remaining thereof in an unlocked position until a predetermined reference position in the first adjustment region is reached.

For this purpose, the control contour can have ramp portions, which run parallel to one another, on mutually averted (front and rear) side surfaces, wherein, depending on the adjustment direction of the first adjustment part, one portion of the control member can slide on the one or the other ramp portion and is therefore adjusted in the one or the other adjustment direction.

The transmission element can be designed and provided to block the control member at least in one of the two positions against a displacement in the first adjustment region at least over a part of the possible adjustment distance of the first adjustment part while the first adjustment part is adjusted. In such a variant embodiment, not only is a certain adjustment movement therefore forced on the control member via the transmission element, but rather the control member is then also kept via the transmission element in a taken-up position until the first adjustment part has taken up a certain adjustment position in the first or second adjustment region.

It can basically be provided that the adjustment element is guided displaceably in a guide slot of the control device. Such a guide slot has, for example, a curved profile. In addition, in such a variant embodiment, the guide slot can be designed with a holding bay or with a plurality of holding bays for a portion of the control member. A portion of the control member can be displaced here into a holding bay by the transmission element during an adjustment of the first adjustment part and can then be kept in said holding bay in a form-fitting manner via the transmission element in order to keep the control member in such a taken-up (safety or active) position and to block the same against a displacement. Via possible holding bays, the guide slot for the transmission element therefore also defines a guide and form-fitting regions for at least one portion of the control member in order to predetermine a certain position for the latter and to keep the same in said position via the transmission element.

In a variant embodiment in which the first adjustment part is adjustable about an axis of rotation relative to the second adjustment part, an adjustment movement about the axis of rotation of the first adjustment part—preferably along a circular path portion—is predetermined for the transmission element via a guide slot. In the case of a translatory movement of the first adjustment part, the guide slot can in turn likewise predetermine a translatory adjustment movement for the transmission element, with a movement direction which runs parallel to the adjustment direction of the first adjustment part.

In an exemplary embodiment, the first adjustment part has at least one coupling element by means of which, when the first adjustment part is adjusted between the two adjustment regions, an adjustment force is exerted on the transmission element in order to adjust same. An adjustment force for adjusting the first adjustment part into the control device is therefore initiated via the at least one coupling element in order to activate said control device, in particular during an adjustment from the second adjustment region into the first adjustment region, and to control the keeping of the latching device in a release position via same. A coupling element can be formed, for example, by a stop on the first adjustment part, which stop carries along the transmission element and therefore adjusts the same relative to the control member during an adjustment of the first adjustment part.

As already explained in the introduction, the first adjustment part can be formed, for example, by a backrest of the vehicle seat and the second adjustment part can be formed by a seat part of the vehicle seat, wherein the backrest is adjustable about an axis of rotation relative to the seat part. In such a variant embodiment, and consequently oriented to the solution according to the invention, the backrest preferably is settable in its inclination with respect to the seat part and is lockable in different adjustment positions (use positions) in the first adjustment region, is foldable forward from the first adjustment region into the second adjustment region into a loading compartment position and is lockable in said loading compartment position, and during the folding back into the first adjustment region, is automatically lockable by means of the control device and the latching device in a predetermined reference position in which the backrest is set upright and a user can sit on the vehicle seat, wherein the reference position lies between two settable end positions of the first adjustment region, and therefore at least one end position or a plurality of use positions can be passed through under action of the (activated) control device in order to reach the reference position.

The latching device here preferably has at least one latching fitting which, via the additional control device, which is mechanically coupled thereto, is initially blocked against locking, when the backrest is folded back, until the reference position predetermined by the control device is reached.

In a variant embodiment, the first adjustment part can alternatively or additionally be formed by a foldable and/or extendable headrest of the vehicle seat,
an adjustable center armrest of the vehicle seat,
a seat surface of the vehicle seat that is adjustable in its inclination and/or height and/or longitudinal position, or
a seat under frame of the vehicle seat that is adjustable in the longitudinal direction of the seat. Consequently, a control device according to the invention is usable not only during a rotatory adjustment of a first adjustment part relative to a second adjustment part, but also in the case of a translatory adjustment of a first adjustment part on a vehicle seat. A (passive) latching mechanism of a latching device can always be influenced here in a specific manner via the control device, and therefore said latching mechanism, during an adjustment of the first adjustment part from a second adjustment region into a first adjustment region, locks only if at least one adjustment position of the first adjustment region has been passed through and a certain adjustment position, which is set as the reference position, of the first adjustment region is reached. Until the reference position is reached, locking in another adjustment position of the first adjustment region is blocked via the control device.

Thus, for example, in the case of a foldable headrest which is mounted pivotably about a transverse axis, said headrest can be brought via a control device according to the invention into a predefined comfort position during the folding back into a use position. Only then can any desired adjustment position of the first adjustment region be taken up again and locked via the latching device.

Also in the case of an adjustable center armrest which is mounted laterally on a vehicle seat so as to be pivotable about a transverse axis, after a folding-away operation, a certain comfort position can be predetermined via a control device according to the invention, the comfort position constituting one of a plurality of use positions which can be set in principle within the first adjustment region. Only after locking in said comfort position can any desired use position be set again and locked via the latching device. It is therefore not necessary here that the center armrest can be adjusted into an end or stop position of the first adjustment region during a folding-back operation and only subsequently can be adjusted again into a comfort position advantageous for the seat user.

In the case of a seat surface which is adjustable in its inclination, the inclination adjustment mechanism is frequently provided with an assisting spring (with the direction of action of force directed upward). This has the effect that, directly after unlocking of the associated latching device, a stop or end position has to be taken up, and the user firstly has to set the seat surface into the desired comfort position with an additional expenditure of force (or by means of weight). A vehicle seat with a control device according to the invention can limit the undesirable movement here during the unlocking of the latching device and with the supporting spring stretched, and therefore a certain comfort position is always taken up and the seat surface is only subsequently released again in order then to be able to adjust it into the stop or end position.

The same applies analogously to a height adjustment mechanism of a seat surface, in which seat kinematics convert a rotatory movement of a latching device into a linear movement of the seat surface.

A control device according to the invention is also analogously usable when setting an adjustment position during the longitudinal adjustment of the seat and during a height adjustment of a headrest or a depth adjustment of a seat surface, in which linear adjustability of the respective first adjustment part is in each case provided.

BRIEF DESCRIPTION OF THE DRAWINGS

Further advantages and features of the invention will become clear in the description below of exemplary embodiments with reference to the figures.

FIGS. 3A-3F show the vehicle seat from FIGS. 1A-1C in different positions and phases during the folding of the backrest forward and back with the use of a control device according to the invention.

FIG. 4 shows part of an exemplary embodiment of a vehicle seat according to the invention with a latching device having a latching fitting and with an additional control device on a longitudinal side of the vehicle seat.

FIGS. 7A-7C each show, in a side view, the control device in different phases during the folding of the backrest back out of a loading compartment position.

DETAILED DESCRIPTION

Figure 1A:
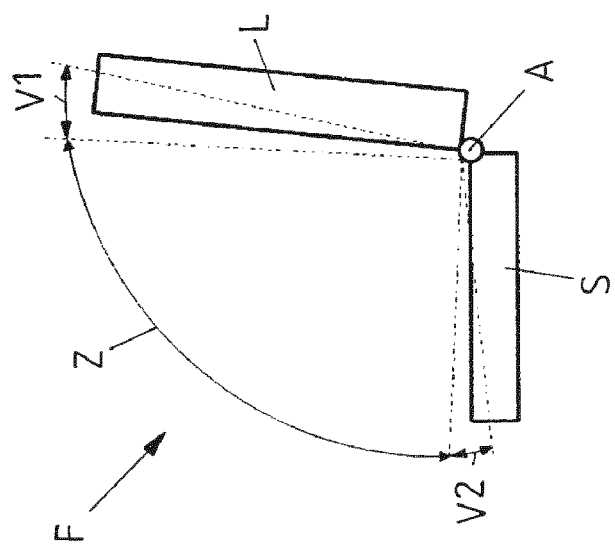
FIGS. 1A-1C schematically show a vehicle seat with a pivotable and foldable backrest with an illustration of different adjustment regions.
Figure 1B:
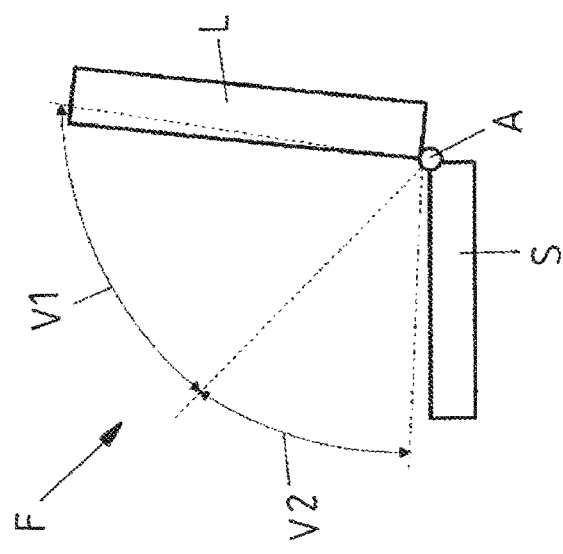

FIGS. 1A and 1B first of all show, in a schematic view, a vehicle seat F with a seat part S and a backrest L which can be pivoted about an axis of rotation A with respect to the seat part S. The backrest L forms a first adjustment part of the vehicle seat F, which can be adjusted relative to the seat part S as the second adjustment part. The backrest L is lockable here in an upright position in different adjustment positions in a first adjustment region V1 in order to set an inclination of the backrest L with respect to the seat part S. Different use positions of the backrest L are therefore settable and lockable in the first adjustment region V1. Furthermore, the backrest L can be folded forward in the direction of the seat part S into an adjustment region V2. In the second adjustment region V2, the backrest L can likewise be locked in at least one loading compartment position.

The locking of the backrest L in the respective adjustment regions V1 and V2 can be realized here via a latching device which is known per se and has at least one latching fitting. The latching fitting locks the backrest L in a locked state with respect to the seat part S. The latching fitting can be unlocked manually such that the latching device is in a release position and the backrest L can be pivoted. In the case of a vehicle seat from FIG. 1A, the latching device (not illustrated specifically) is designed in such a manner that the backrest L can be locked in different adjustment positions in the first adjustment region V1, which comprises, for example, a pivoting region of approximately 30 to 40°, and in at least one loading compartment position in the second adjustment region V2. The backrest L is pivotable between the two adjustment regions V1 and V2 via a latching-free intermediate region Z in which the backrest L cannot be locked with respect to the seat part S by means of the latching device.

In the case of vehicle seats known up to now, there is regularly the difficulty that, during the adjustment of the backrest L from the second adjustment region V2 defining the loading compartment position into the first adjustment region V1 defining the use position, the backrest L is automatically locked via the latching device in the first free latching position after the latching-free intermediate region Z. The latching device therefore changes automatically immediately into a latching position and locks the backrest L as soon as the backrest L reaches the first adjustment region V1. Locking of the latching device therefore takes place in a first of two end positions of the first adjustment region V1 within which setting of the inclination of the backrest L is possible. However, this first end position is generally not optimum for a seat user from comfort and/or safety reasons, and therefore a seat user has to actuate the latching device again in order to take up an optimum position.

A comparable situation can also occur in the modified exemplary embodiment of a vehicle seat F in FIG. 1B, in which no latching-free intermediate region Z is provided between the two adjustment regions V1 and V2. The two adjustment regions V1 and V2 are directly adjacent to each other here, wherein locking of the backrest L with respect to the seat part S is possible in the two adjustment regions V1 and V2. However, the adjustment region V1 again defines the sum total of the possible use positions in which a seat user can still sit on the vehicle seat F. By contrast, the second adjustment region V2 defines the positions of the backrest L, in which, in order to increase the storage space, the backrest L is folded forward onto the seat part S to an extent such that a seat user can no longer sit on the vehicle seat F. In the second adjustment region V2, the backrest L is therefore in a non-use position. A comfortable seat position can therefore be set and locked in the adjustment region V1, while, in the second adjustment region V2, the backrest L is folded forward in order to increase the storage space in the trunk.

There is also now the difficulty here that, when the backrest L is folded back out of the second adjustment region V2 into the first adjustment region V1, the backrest L is automatically locked in a first end position of the first adjustment region V1 and therefore in a position still folded forward comparatively far, and a user has first to determine a comfortable use position from a multiplicity of possible use positions of the first adjustment region V1 by actuating the latching device several times and repeatedly adjusting the backrest L.

However, there is a comparable problem not only in the case of a rotatorily adjustable first adjustment part, such as the backrest L, but also in the case of a first adjustment part T1 of a vehicle seat F, which adjustment part is adjustable substantially rectilinearly relative to a second adjustment part T2 or in which rotatory and translatory movements are combined. Examples of a translatorily adjustable first adjustment part T1 are, for example, a seat underframe which is mounted in a longitudinally displaceable manner with respect to the longitudinal axis of the vehicle, a seat surface which is adjustable in the longitudinal direction of the seat or a substantially vertically adjustable headrest of the vehicle seat. Such adjustment parts T1 and T2 are illustrated schematically in FIGS. 2A and 2B. A first adjustment part T1 is adjustable here along a rectilinearly extending adjustment axis B relative to a second adjustment part T2 within two adjustment regions V1 and V2 arranged one behind the other along the adjustment axis B.

Figure 2A:
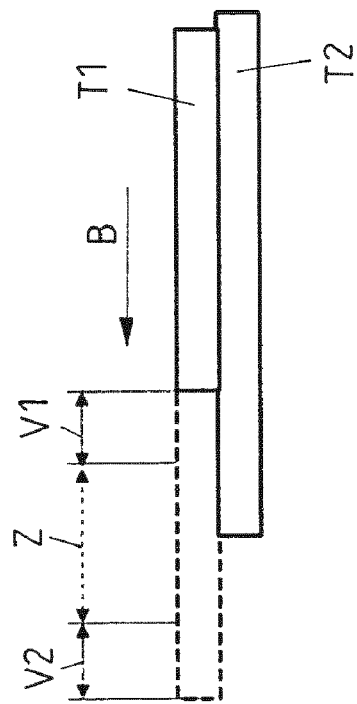
FIGS. 2A-2C schematically show a first adjustment part of a vehicle seat which is adjustable in a translatory manner relative to a second adjustment part, with an illustration of different adjustment regions.

In the exemplary embodiment of FIG. 2A, the first adjustment part T1 is adjustable within two adjustment regions V1 and V2 and is lockable with respect to the second adjustment part T2 analogously to the exemplary embodiment of the vehicle seat F of FIG. 1A. The two adjustment regions V1 and V2 lie one behind the other here along the adjustment axis B and are separated by a latching-free intermediate region Z.

Figure 2B:
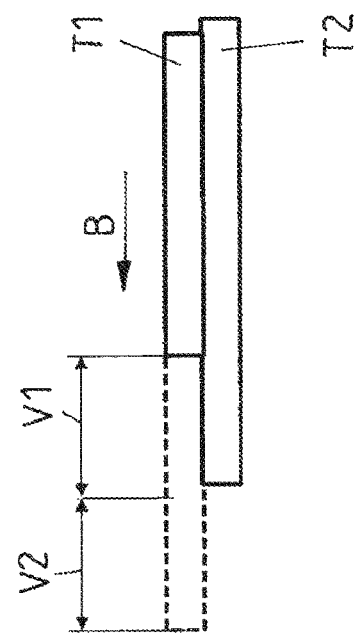

Analogously to the exemplary embodiment of the vehicle seat F of FIG. 1B, FIG. 2B shows a first adjustment part T1 which is adjustable and lockable along the adjustment axis B relative to the second adjustment part T2 within two adjustment regions V1 and V2 which are adjacent to each other. A latching-free intermediate region Z is not provided here between the adjustment regions V1 and V2.

Figure 2C:
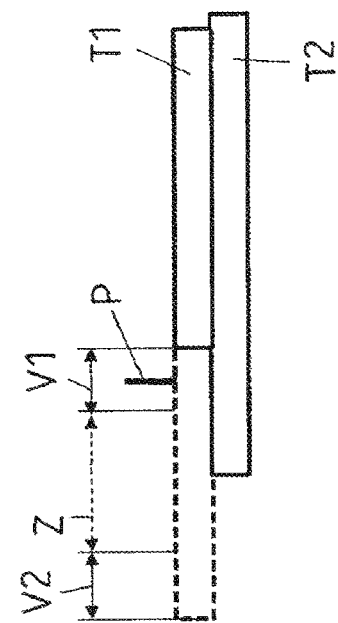
Figure 1C:
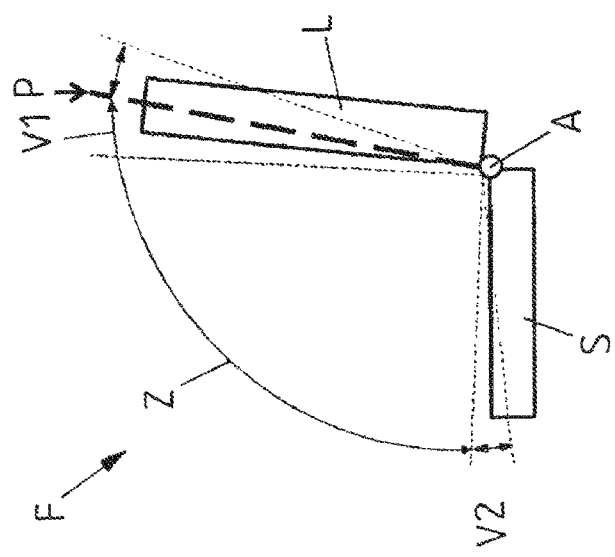

According to the illustrations in FIGS. 1C and 2C, it is in each case provided according to the invention in the two illustrated cases of FIGS. 1A to 1B and 2A to 2B that, via a control device, which interacts with the respectively associated latching device, on the vehicle seat F during the setting back from the second adjustment region V2 into the first adjustment region V1 an immediate locking of the respective first adjustment part L or T1 upon reaching the first adjustment region V2 is prevented and the respective first adjustment part L or T1 can take up an adjustment position P, which is considered to be a reference position, within the first adjustment region V1 before the latching device is locked again.

The invention is based here on the basic concept of providing a control device on the vehicle seat F, the control device making it possible for a preset, consistently identical reference position to be taken up within the first adjustment region V1 during an adjustment of a first adjustment part L or T1 from a second adjustment region V2 into a first adjustment region V1 in which locking in a plurality of different adjustment positions is made possible via a passive latching mechanism of a latching device. The control device keeps the latching device here in a release position when the first adjustment part L or T1 has been adjusted from the second adjustment region V2 into the first adjustment region V1 and beyond at least one of the possible adjustment positions of the first adjustment region V1 and has therefore passed through at least the end position lying in the direction of the second adjustment region V2. A change into a latching position of the latching device is only made possible again via the control device when the first adjustment part reaches that adjustment position P of the first adjustment region V1 which is specified as the reference position. Other adjustment positions of the first adjustment region V1 are blocked via the (activated) control device, and therefore the latching device can ultimately only latch in place and lock again when the adjustment position P is reached. Subsequently, i.e. after the locking in the reference position and renewed unlocking of the latching device by the user, locking in the complete adjustment region V1 (between and at the two end positions) is possible again.

It can thereby be ensured that, for example after the backrest L is folded back from a loading compartment position into a use position, a user always finds a comfort position of the backrest L that is preset, is comfortable and is preferably the best possible in respect of minimizing a risk of injury to a typical seat user when the user sits on the vehicle seat F. The adjustment position P which is set as the reference position independently of the seat user may also be different here to an adjustment position which is set individually before the backrest L is folded forward. The control device thus does not ensure that the backrest L is locked again in an adjustment position previously taken up. On the contrary, the control device is used to achieve locking in a reference position P which is independent of the previous adjustment position in the first adjustment region V1 and, for a typical seat user and therefore in the majority of possible use situations, ensures comfortable sitting and/or the best possible occupant protection for the seat user.

The keeping of the latching device in a release position and the associated blocking of the locking of the backrest L in other adjustment positions of the first adjustment region V1 are achieved via a mechanical control device which interacts with the latching device and in the present case is activated only in a certain sequence of movement of the backrest L with respect to the seat part S and/or in a combination of the movement of the backrest L with an actuating movement of an actuator element of the latching device. After the reference position P is reached, the control device is switched to inactive again, and therefore, upon renewed unlocking of the latching device, any desired adjustment position within the entire adjustment region V1 can be taken up again and the backrest L can be locked therein.

FIGS. 3A to 3F show a possible sequence of the adjustment movement of the backrest L, during which unlocking and locking via the latching device is controlled via a control device (not illustrated specifically here) and, for this purpose, the control device is activated and deactivated again in a specific manner.

In order to increase a storage space, the initially upright backrest L present in the adjustment region V1 (FIG. 3A) is first of all folded forward into the adjustment region V2 onto the seat part S and locked in a loading compartment position taken up as a result (FIG. 3B). Subsequently, the backrest L is folded back out of the second adjustment region V2 into the first adjustment region V1 defining the use positions (FIG. 3C). During the resetting movement of the backrest L, the control device is activated, and therefore an adjustment position of the backrest L that is "uncomfortable" for a seat user and/or is unfavorable in respect of the risk of injury in the event of a crash can be passed through in the first adjustment region V1. The latching device is therefore kept in a release position via the control device such that the backrest L is automatically locked again via the latching device only once back in a reference position P—here at the end of the first adjustment region V1 (FIG. 3D). A seat user can sit comfortably on the vehicle seat F in the taken-up reference or comfort position of the backrest L (FIG. 3E). Since the control device is deactivated again at the latest with the backrest L reaching the reference position P, the backrest L can subsequently be set again in its inclination with respect to the seat part S as desired within the adjustment region V1 and locked via the latching device. The backrest L can thus be locked in particular in an adjustment position P1 which, during the folding back out of the loading compartment position, was initially passed through and in which the backrest L is pivoted further forward in the direction of the seat part S than in the reference position P (FIG. 3F).

FIGS. 4, 5, 6A to 6B and 7A to 7C now illustrate a possible exemplary embodiment of a vehicle seat F with a possible variant according to the invention of a control device 3 that interacts with a customary latching fitting 2. The backrest L of the vehicle seat F is mounted here so as to be pivotable again about an axis of rotation A relative to a seat part S of the vehicle seat F and in particular is foldable forward in the direction of the seat part S into a loading compartment position. A latching device with the latching fitting 2 is provided for locking the backrest L in an upright use position and in the loading compartment position.

The latching fitting 2 is arranged on a side part ST of the seat part S. In the present case, a bearing opening O at which the circular-disk-shaped latching fitting 2 is arranged and fastened is formed on a laterally protruding bearing portion LA of the side part ST for this purpose. Said latching fitting 2 is coupled to a transversely extending actuator shaft 1 of the latching device, via which the latching fitting 2 can be transferred from a latching position, into which the latching fitting is pretensioned, into a release position. The actuator shaft 1 here connects two latching fittings 2, which are arranged on opposite longitudinal sides, to each other, of which only the latching fitting 2 is illustrated in FIGS. 4 to 7C.

The actuator shaft 1 is connected to an actuating unit on a longitudinal side of the vehicle seat F in order, when required, manually to introduce an actuating torque into the actuator shaft 1 such that locking via the latching fitting 2 is released and the backrest L can be adjusted relative to the seat part S. The actuator shaft 1 is of profiled design here in order in a simple manner to produce a non-rotatable, form-fitting connection with an unlocking element (not illustrated specifically here) of the latching fitting 2. To open/unlock the latching fitting 2, the profiled actuating shaft 1 is set into a rotatory movement, e.g. rotated in the clockwise direction, via an actuating unit (not illustrated here). When the latching fitting 2 is closed/locked, the actuator shaft 1 rotates in the opposite direction of rotation, for example counterclockwise.

An additional control device 3 which is likewise arranged on the bearing portion LA of the side part ST and is mounted next to the latching fitting 2 in the direction of extent of the actuator shaft 1 mechanically interacts here with the latching fitting 2. A driver disk 31, the axis of rotation of which coincides with the axis of rotation A of the actuator shaft 1, is mounted rotatably on a bearing plate 30 of the control device 3. The driver disk 31 is connected here in a form-fitting manner to the actuator shaft 1, and therefore a rotational movement of the actuator shaft 1 is transmitted to the driver disk 31 and conversely a rotational movement of the driver disk 31 is transmitted to the actuator shaft.

Furthermore, a control member in the form of a pivot lever 32 is arranged on the bearing plate 30 of the control device 3. Said pivot lever 32, like the driver disk 31, is arranged on a side of the bearing plate that faces away from the latching fitting 2. The pivot lever 32 can act on the actuator shaft 1 of the latching device via the driver disk 31, as is illustrated in detail with reference to FIGS. 5, 6A to 6B and 7A to 7C.

An adjustment movement of the pivot lever 32 for acting on the driver disk 31 and therefore on the actuator shaft 1 is controlled by coupling elements which are provided on a backrest frame part 4 of the backrest L and are in the form of stops 41 and 42. Said stops 41 and 42 are coupled to a transmission element 33, which is illustrated in the figures below which have yet to be explained in more detail, and transmit some of the adjustment force, which is applied for pivoting the backrest L, into the control device 3 such that, when the backrest L is folded back out of a loading compartment position, the control device 3 is initially activated in order to permit the passing through one or more adjustment positions of the first adjustment region V1, and is subsequently deactivated again in order to permit locking of the backrest L in the predetermined reference position P.

As is apparent in the overall view of FIGS. 4, 5 and 6A to 6B, the driver disk 31 and the here V-shaped pivot lever 32 of the control device 3 are designed and arranged with respect to each other in such a manner that a rotational movement of the driver disk 31 can be initiated via the pivot lever 32 only in one of two possible directions of rotation D1 or D2 about the axis of rotation A, here along the direction of rotation D1 (in the clockwise direction). For this purpose, one of two lever ends 32a, 32b of the pivot lever 32 lies against a contact portion 312 of the driver disk 31, said contact portion protruding radially with respect to the axis of rotation A. This lever end 32a acting on the driver disk 31 at the contact portion 312 protrudes from a base portion 32c of the V-shaped pivot lever 32 at which the pivot lever 32 is mounted so as to be pivotable about an axis of rotation C parallel to the axis of rotation A of the driver disk 31.

The other lever end 32b of the pivot lever 32 is in contact with a transmission element 33 of the control device 3. Said transmission element 33 is guided displaceably at a guide slot 300, which is spaced apart from the axis of rotation A, of the bearing plate 30. In this connection, the guide slot 300 runs here in a curved manner and predetermines an adjustment distance with respect to the pivot lever 32 for the transmission element 33 guided displaceably therein. A projecting control pin 33a is provided on the transmission element and protrudes on the transmission element 33 substantially parallel to the axis of rotation A, C. Said control pin 33a defines, by way of its lateral surface, a control contour 330 via which the transmission element 33 enters into contact with the lever end 32b of the pivot lever 32 and can force the pivot lever 32 into a pivoting movement in pivoting directions R1, R2 about its axis of rotation C. For this purpose, the lever end 32b has a sliding portion in the form of a counter pin which can slide on the control contour 330 of the control pin 33a when the transmission element 33 is displaced along its guide slot 300. When the backrest L is folded forward out of a use position into the loading compartment position, the counter pin of the lever end 32b slides here along a rear ramp portion 3301—with respect to a seat longitudinal axis pointing in the direction of travel FR—of the control contour 330. When the backrest L is folded back out of the loading compartment position into a use position, the counter pin slides in turn along a front ramp portion 3302 of the control contour 330. By this means, the pivot lever 32 is adjusted about its axis of rotation C in the one pivoting direction R1 or in the pivoting direction R2 opposed with respect thereto, depending on the adjustment direction of the backrest L. As already explained, the respectively necessary adjustment force for displacing the transmission element 33 along the guide slot 300 in one of two mutually opposed sliding directions S1 or S2 is initiated here via the stops 41 and 42 of the backrest frame part 4 of the backrest L during the pivoting of the latter into the transmission element 33. The transmission element 33 with the control contour 330 is therefore coupled to the adjustment movement of the backrest L via the two stops 41 and 42. When the backrest angular position changes, the transmission element 33 is also moved at the same time and, as a result, depending on the backrest position, controls the closing and opening operation of the control mechanism provided by the control device 3.

Figure 5:
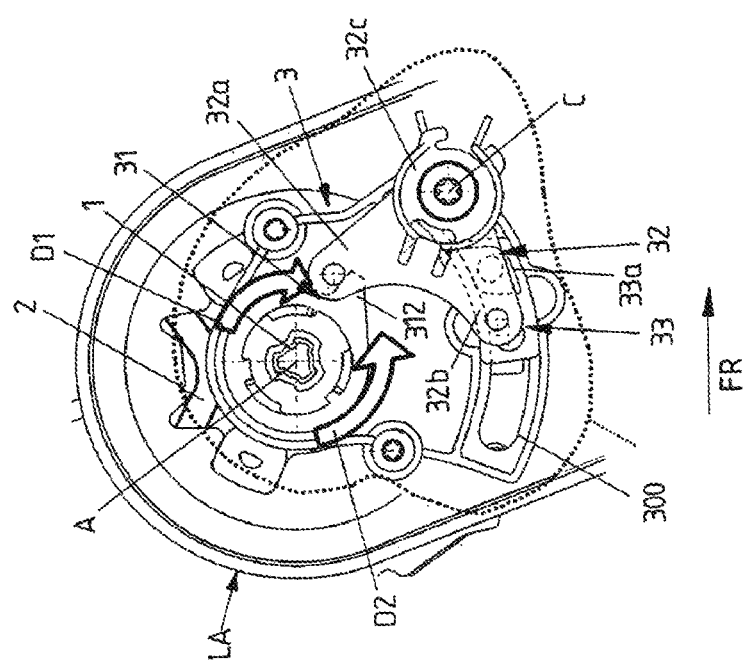
FIG. 5 shows, on an enlarged scale, a side view of the latching device and of the control device.

In a normal use position in which a seat user can sit on the vehicle seat F and which is predetermined by the first adjustment region V1, the pivot lever 32 is in an inactive position corresponding to FIG. 5. If the actuator shaft 1 is rotated in order to transfer the latching device into the release position, although the driver disk 31 is rotated at the same time, said driver disk cannot, however, rotate the pivot lever 32 at the same time via the contact portion 312 since the driver disk 31 can only transmit a force to the pivot lever 32 in the direction of rotation D2. The pivot lever 32 thus remains in its inactive position. When the latching device changes into a latching position and therefore when the latching mechanism closes, the driver disk 31 rotates back and lies again via its contact portion 312 against the pivot lever 32.

By contrast, when the backrest L is folded forward into the loading compartment position of the second adjustment region V2, the transmission element 33 interacts via its control contour 330 with the (lower) lever end 32b and pivots the latter along the pivoting direction R1. By this means, the other (upper) lever end 32a is spaced apart from the contact portion 312. The pivot lever 32 is therefore transferred into a safety position in which it ensured that the pivot lever 32 does not act on the driver disk 31, in order not to undesirably unlock the latching fitting 2 and not to block the latter against locking. The pivot lever 32 is therefore transferred into a position in which its (upper) lever end 32a cannot act counter to a locking of the backrest L in its second adjustment region V2. For this purpose, the lever end 32b is pressed (upward) via the control contour 330 into an (upper) holding bay 301 formed on the guide slot 300 and is kept in a form-fitting manner therein via the control pin 33a until the backrest L has reached a loading compartment position and is locked therein. When the loading compartment position is reached, the lever end 32b is no longer blocked by the transmission element 33 against displacement out of the holding bay 301. After the lever end 32b is no longer blocked in the holding bay 301, the pivot lever 32 can change back into the starting position by means of a restoring spring, for example in the form of a leg spring which, on the one hand, is supported on the bearing plate 30 and, on the other hand, acts on the pivot lever 32.

Figure 6A:
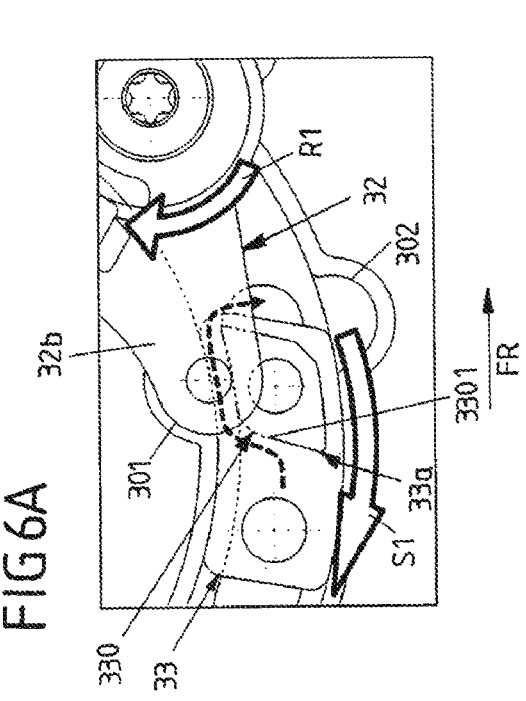
FIGS. 6A-6B show a transmission element of the control device, the transmission element interacting with a control member of the control device, on an enlarged scale and in different phases during the folding of the backrest forward and back.
Figure 6B:
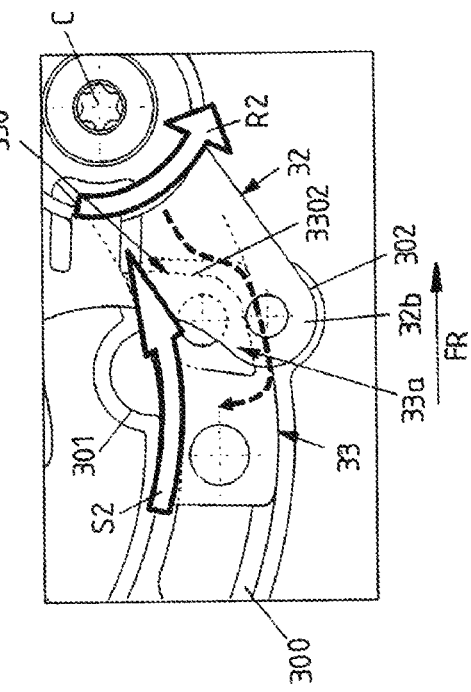

While the aforementioned adjustment movements during the folding of the backrest L forward are visible especially from the enlarged illustration of FIG. 6A, the activation of the control device 3 when the backrest L is folded back out of the loading compartment position into the predetermined reference position P will now be explained below especially with reference to the enlarged illustration of FIG. 6B.

When the backrest L is folded back, the transmission element 33 is displaced forward in the sliding direction S2 (from the left to the right in FIG. 6B) along its guide slot 300. After a certain pivoting position, the front ramp portion 3302 of the control contour 330 is pressed here against the counter pin of the lever end 32b such that the pivot lever 32 is pivoted about its axis of rotation C in the pivoting direction R2 (counterclockwise). In this case, the lever end 32b is pressed (downward) into a (lower) holding bay 302 of the guide slot 300 and held therein via the transmission element 33. Via the form-fitting engagement of the lever end 32b in the holding bay 302, which lies opposite the holding bay 301 for the safety position, the pivot lever 2, in the pivoted position thus taken up, is blocked against an adjustment for a predetermined part of the adjustment distance of the backrest L during the folding-back operation.

The pivot lever 32 here is in an active position in which the other lever end 32a presses against the contact portion 312 of the driver disk 31 and rotates the latter about its axis of rotation A in the direction of rotation D1. The latching fitting 2 is thereby unlocked. As long as the pivot lever 32 is in this active position and is blocked against displacement by the transmission element 33, the pivot lever 32 exerts a holding force via its lever end 32a on the driver disk 31 and consequently also on the actuator shaft 1 in order to keep the latching device with the latching fitting 2 in a release position in which locking of the backrest L via the latching device is prevented. The latching mechanism is consequently opened by the rotatory movement of the driver disk 31 and blocked in the open position. The open position remains blocked here until the transmission element 33 has been displaced past the (lower) lever end 32b in the sliding direction S2 to such an extent that the pivot lever 32 is no longer blocked by the transmission element against pivoting back (and can change back again into the starting position) and the driver disk 31 is released again.

By the position of the transmission element 33 depending directly on the pivoted position of the backrest L, a precisely defined reference position P in which the backrest L can be locked again in its first adjustment region V1 can therefore be predetermined via the control device 3 when the backrest L is folded back. The latching device can lock again only after the release of the pivot lever 32 and the associated deactivation of the control device 3. The transmission element 33, the pivot lever 32 and the driver disk 31 of the control device 2 are coupled to one another here in such a manner that, when the backrest L is folded back out of a loading compartment position into a use position, the latching device with the latching fitting 2 is first of all blocked against locking in some use positions and is kept in a release position. Only when a use position preset as the reference position via the control device 3 is reached within the first adjustment region V1 is the latching device released again such that it can change into a latching position and can lock again. The effect therefore achieved purely mechanically via the control device 3 is that, when the backrest L is pivoted back, certain use positions are initially passed through, which use positions, after a subsequent deactivation of the control device 2, are settable again freely by a user and in which use positions the backrest L can be locked. However, the backrest L, during the folding-back operation, is initially blocked via the control device 3 against blocking in said use positions and, via the latching device with the latching fitting 2, is first of all automatically locked in a predefined reference position which, on the one hand, permits comfortable sitting for a typical seat user and, on the other hand, is optimized in respect of a possible risk of injury in the event of a crash.

The manner of operation of the control device 3 in cooperation with the latching device having the latching fitting 2 in different phases during the folding back of the backrest L from a loading compartment position into the preset reference position is illustrated once again with reference to FIGS. 7A, 7B and 7C. It is once again clarified by this how the pivot lever 32 is initially in an inactive position and the control device 3 is then activated by the displaced transmission element 3 and the pivot lever 32 is transferred into an active position in which the latching fitting 2 is kept open. In said active position of the pivot lever 32, at least one "uncomfortable" use position of the backrest L is then passed through while the latching mechanism is kept in the open position by the pivot lever 32 and the driver disk 31. After the pivot lever 32 is released by the transmission element 33 displaced further, the latching fitting 2 which is pretensioned into the locked position automatically locks again and therefore locks the backrest L in the predetermined reference position.

LIST OF REFERENCE SIGNS

1 Actuating shaft (actuator element)
2 Latching fitting
3 Control device
30 Bearing plate (bearing component)
300 Guide slot
301, 302 Holding bay
31 Driver disk
312 Contact portion
32 Pivot lever (control member)
32a, 32b Lever end
32c Base
33 Transmission element
330 Control contour
3301, 3302 Ramp portion
33a Control pin
4 Backrest frame part
41, 42 Stop (coupling element)
A Axis of rotation
B Adjustment axis
C Axis of rotation
D1, D2 Direction of rotation
F Vehicle seat
FR Direction of travel
L Backrest (first adjustment part)
LA Bearing portion
O Bearing opening
P, P1 Adjustment position
R1, R2 Pivoting direction
S Seat part (second adjustment part)
S1, S2 Sliding direction
ST Side part
T1, T2 Adjustment part
V1, V2 Adjustment region
Z Intermediate region

The invention claimed is:

1. A vehicle seat comprising at least one first and one second adjustment part and a latching device, wherein the first adjustment part is formed by a backrest of the vehicle seat and the second adjustment part is formed by a seat part of the vehicle seat, and wherein:

the first adjustment part is lockable in a first adjustment region in a plurality of adjustment positions relative to the second adjustment part via the latching device, and is adjustable relative to the second adjustment part when the latching device is in a release position, for setting the backrest in its inclination with respect to the seat part;

the first adjustment part is adjustable from the first adjustment region into a second adjustment region in which the backrest is configured to be folded forward in a direction of the seat part or even onto the seat part, and, in the second adjustment region, is likewise lockable relative to the second adjustment part via the latching device; and the latching device automatically changes from a release position into a latching position in order to lock the first adjustment part in an adjustment position in the first adjustment region when the first adjustment part is adjusted from the second adjustment region into the first adjustment region; and a control device which interacts with the latching device and which:

keeps the latching device in the release position, in which the first adjustment part is not locked via the latching device and thereby is adjustable relative to the second adjustment part, when the first adjustment part is adjusted from the second adjustment region into the first adjustment region and until the first adjustment part has been adjusted beyond at least a first of the possible adjustment positions of the first adjustment region, and permits a change into a latching position only when the first adjustment part reaches a certain subsequent adjustment position in the first adjustment region that is preset as a reference position, for a typical seat user, within the first adjustment region, wherein the latching device comprises an actuator element and the control device has at least one control member which is configured to act upon the actuator element of the latching device in order to keep the latching device in the release position when the first adjustment part has been adjusted from the second adjustment region into the first adjustment region;

wherein the control device has an adjustable transmission element with a control contour which predetermines at least two different positions for the control member depending on whether the first adjustment part is adjusted from the first adjustment region into the second adjustment region or conversely from the second adjustment region into the first adjustment region; and wherein an adjustment distance of the transmission element is predetermined by a guide slot of the control device.

2. The vehicle seat as claimed in claim 1, wherein the control member is adjustable between an active position and an inactive position, wherein, in the active position, a holding force is exerted on the actuator element of the latching device via the control member in order to keep the latching device in the release position, and, in the inactive position, no force is transmitted to the actuator element via the control member.

3. The vehicle seat as claimed in claim 1, wherein the actuator element is connected to a driver element of the control device, and the control member is designed and provided in order to exert an adjustment force on the driver element during an adjustment of the first adjustment part from the second adjustment region into the first adjustment region.

4. The vehicle seat as claimed in claim 1, wherein the actuator element comprises a shaft which is mounted rotatably on the vehicle seat.

5. The vehicle seat as claimed in claim 1, wherein the control member is adjustable via the first adjustment part.

6. The vehicle seat as claimed in claim 5, wherein the control device has an adjustable transmission element with a control contour which predetermines at least two different positions for the control member depending on whether the first adjustment part is adjusted from the first adjustment region into the second adjustment region or conversely from the second adjustment region into the first adjustment region, wherein the first adjustment part has at least one coupling element via which, when the first adjustment part is adjusted between the two adjustment regions, an adjustment force is exerted on the transmission element in order to adjust the transmission element.

7. The vehicle seat as claimed in claim 1, wherein the control member is mounted rotatably.

8. The vehicle seat as claimed in claim 1, wherein the transmission element can interact via its control contour with the control member in such a manner that the control member is adjusted in a first adjustment direction when the first adjustment part is adjusted from the first adjustment region into the second adjustment region, and the control member is adjusted in a second adjustment direction when the first adjustment part is adjusted from the second adjustment region into the first adjustment region.

9. The vehicle seat as claimed in claim 1, wherein the transmission element is designed and provided to block the control member at least in one of the at least two positions against a displacement in the first adjustment region at least over a part of the possible adjustment distance of the first adjustment part while the first adjustment part is adjusted.

10. The vehicle seat as claimed in claim 1, wherein an adjustment movement about an axis of rotation, about which the first adjustment part is rotatable, is predetermined for the transmission element via the guide slot.

11. The vehicle seat as claimed in claim 1, wherein the backrest:
- is settable in its inclination with respect to the seat part and is lockable in different adjustment positions in the first adjustment region,
- is foldable forward from the first adjustment region into the second adjustment region into a loading compartment position and is lockable in said loading compartment position, and
- during the folding back into the first adjustment region, is automatically lockable via the control device and the latching device in the reference position in which the backrest is set upright and a user can sit on the vehicle seat.

* * * * *